(12) United States Patent
Gupta et al.

(10) Patent No.: US 10,855,428 B2
(45) Date of Patent: Dec. 1, 2020

(54) REDUCING CHANNEL SOUNDING OVERHEAD USING UPLINK OFDMA TRANSMISSIONS

(71) Applicant: Cisco Technology, Inc., San Jose, CA (US)

(72) Inventors: Manoj Gupta, Bangalore (IN); Gautam Dilip Bhanage, Milpitas, CA (US); Brian Donald Hart, Sunnyvale, CA (US); David Stuart Kloper, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/204,938

(22) Filed: Nov. 29, 2018

(65) Prior Publication Data
US 2020/0177340 A1 Jun. 4, 2020

(51) Int. Cl.
*H04B 17/27* (2015.01)
*H04W 64/00* (2009.01)
*H04J 11/00* (2006.01)
*H04L 5/00* (2006.01)

(52) U.S. Cl.
CPC .......... *H04L 5/0053* (2013.01); *H04B 17/27* (2015.01); *H04L 5/0007* (2013.01); *H04L 5/0039* (2013.01); *H04L 5/0094* (2013.01)

(58) Field of Classification Search
None
See application file for complete search history.

(56) References Cited

U.S. PATENT DOCUMENTS

| | | | |
|---|---|---|---|
| 9,219,986 B2 | 12/2015 | Pandey et al. | |
| 10,523,379 B2* | 12/2019 | Hedayat | H04L 65/4076 |
| 2016/0198358 A1* | 7/2016 | Rong | H04W 72/1268 370/235 |
| 2017/0289933 A1* | 10/2017 | Segev | H04B 17/27 |
| 2018/0063821 A1* | 3/2018 | Huang | H04L 5/001 |
| 2018/0139077 A1 | 5/2018 | Amizur | |
| 2018/0184392 A1 | 6/2018 | Prechner | |
| 2018/0249437 A1 | 8/2018 | Lindskog et al. | |
| 2018/0292518 A1* | 10/2018 | Chu | G01S 13/765 |
| 2018/0302930 A1* | 10/2018 | Wang | H04W 76/10 |
| 2019/0075538 A1* | 3/2019 | Bar-Shalom | H04W 64/00 |
| 2019/0132724 A1* | 5/2019 | Asterjadhi | H04W 8/005 |
| 2019/0132762 A1* | 5/2019 | Zhu | H04B 7/024 |
| 2019/0162843 A1* | 5/2019 | Jiang | H04W 64/00 |
| 2019/0200383 A1* | 6/2019 | Jiang | G01S 5/00 |
| 2019/0306824 A1* | 10/2019 | Chu | H04W 64/00 |
| 2019/0306825 A1* | 10/2019 | Lindskog | H04W 24/08 |

(Continued)

FOREIGN PATENT DOCUMENTS

WO 2018080597 A1 5/2018

*Primary Examiner* — Duc T Duong
(74) *Attorney, Agent, or Firm* — Patterson + Sheridan, LLP

(57) ABSTRACT

In one embodiment, a method is performed. An access point (AP) device may communicate signaling relating to a client device allocation for a location-related measurement. The AP device may transmit a trigger frame. The AP device may receive a response to the trigger frame from a client device. The response may include an uplink orthogonal frequency division multiple access (OFDMA) transmission. A location-related measurement of the client device may be determined based on the response to the trigger frame.

18 Claims, 7 Drawing Sheets

(56) References Cited

U.S. PATENT DOCUMENTS

| | | | |
|---|---|---|---|
| 2020/0015041 A1* | 1/2020 | Cariou | H04W 4/029 |
| 2020/0029376 A1* | 1/2020 | Asterjadhi | H04L 1/1628 |
| 2020/0107318 A1* | 4/2020 | Chu | H04L 5/0007 |
| 2020/0154443 A1* | 5/2020 | Patil | H04W 72/005 |
| 2020/0187186 A1* | 6/2020 | Li | H04L 5/00 |

* cited by examiner

REDUCING CHANNEL SOUNDING OVERHEAD USING UPLINK OFDMA TRANSMISSIONS

TECHNICAL FIELD

The present disclosure generally relates to wireless device location.

BACKGROUND

Client devices, such as mobile telephones or location tags, may be used to provide location tracking services, for example, in indoor environments. Use cases for such devices may include floor beacons and asset tracking. Location tracking services may use multiple access point (AP) devices for locating client devices, for example, via triangulation. Each AP device may use multiple antenna configurations. Block acknowledgement processes may be performed for implicitly sounding each antenna configuration, potentially contributing to large signaling overhead.

BRIEF DESCRIPTION OF THE DRAWINGS

For an understanding of aspects of various embodiments described herein and to show how they may be carried into effect, reference is made, by way of example only, to the accompanying drawings.

DESCRIPTION OF EXAMPLE EMBODIMENTS

Overview

Figure 1:
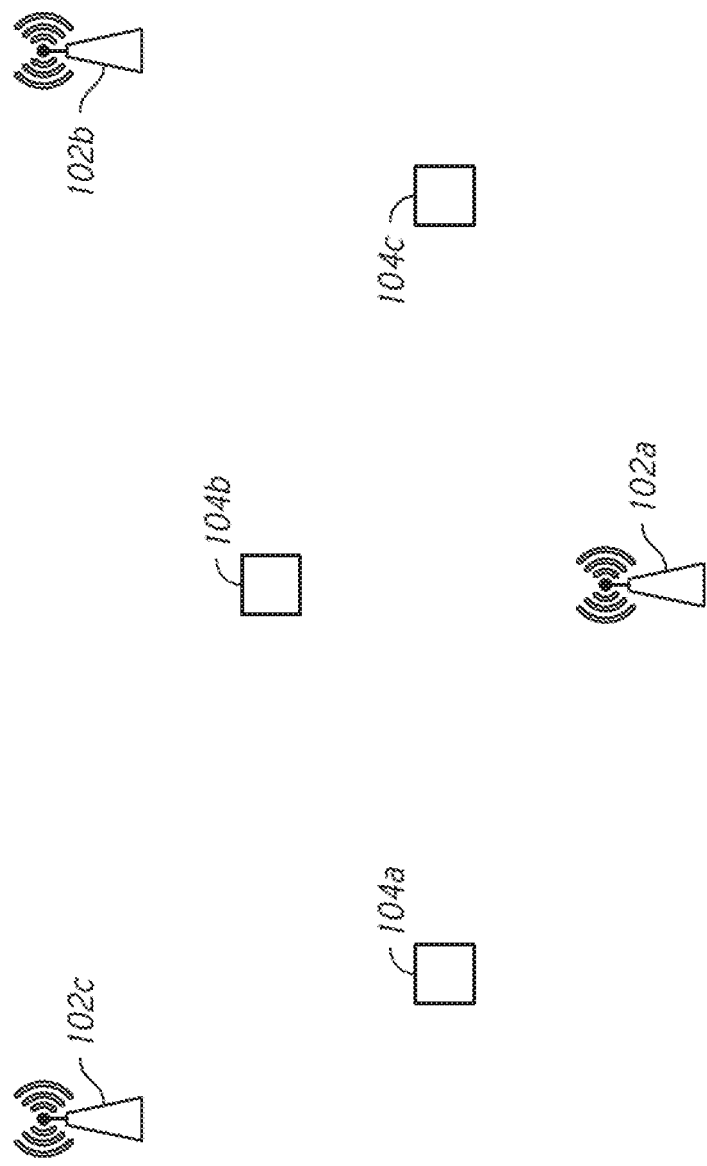
FIG. 1 is a diagram that illustrates an example system in which wireless access points (APs) and client devices may be deployed.

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example embodiments described herein.

Various embodiments disclosed herein may include devices, systems, and methods for device location tracking with antenna switching. In one embodiment, a method is performed. An access point (AP) device may communicate signaling relating to a client device allocation for a location-related measurement. The AP device may transmit a trigger frame. The AP device may receive a response to the trigger frame from a client device. The response may include an uplink orthogonal frequency division multiple access (OFDMA) transmission. A location-related measurement of the client device may be determined based on the response to the trigger frame.

In another embodiment, a first AP device may receive a signal from a second AP device. The signal may relate to a client device allocation for a location-related measurement. The first AP device may receive from a client device a response to a trigger frame. The response may include an uplink OFDMA transmission. A location-related measurement of the client device may be determined based on the response to the trigger frame.

Example Embodiments

In some embodiments, an AP device that is connected to a network may use OFDMA transmissions to determine a location of a client device. The AP device may transmit a trigger frame to the client device. The client device may respond with an uplink OFDMA transmission. The AP device may determine a location-related measurement of the client device, such as a location of the client device, based on characteristics of the response, such as a received signal strength indicator (RSSI), an angle of arrival (AoA). The AP device may determine the location-related measurement of the client device using information received from other AP devices connected to the network.

FIG. 1 illustrates an example system 100 in which access point (AP) devices and client devices may be used for location tracking. The system 100 may be located, for example, in a store, warehouse, or other indoor environment in which it may be beneficial to precisely locate customers, employees, equipment, or other assets. The system 100 may include one or more AP devices 102a, 102b, 102c (collectively referred to as AP devices 102) connected to a network (not shown) and one or more client devices 104a, 104b, 104c (collectively referred to as client devices 104). It will be appreciated that the system 100 may include more or fewer AP devices 102 or client devices 104 than are depicted in FIG. 1.

The client devices 104 may be implemented, for example, as mobile telephones and/or location tag devices. The client devices 104 may be implemented using any of a variety of technologies, including, but not limited to, WiFi.

A client device 104 may transmit a signal, that may be received by one or more AP devices 102. The AP device 102 may determine a received signal strength indicator (RSSI) and/or an angle of arrival (AoA) associated with the signal. The AP device 102 may determine a location-related measurement of the client device 104, for example, based on the RSSI and/or AoA. The AP device 102 may receive and use information from other AP devices 102 in the system 100 to determine the location-related measurement of the client device 104.

The network may determine the locations of the client devices 104 present in the system 100 and may deliver location-relevant content to users. For example, the network may deliver map information or advertisements to users based on their detected locations.

As shown in FIG. 1, the AP devices 102 may be in the vicinity of the client devices 104 and may be able to hear, e.g., receive signals from, client device 104a, for example. The AP devices 102 may tune their radios to the same channel at the same time to listen to the client device 104a. When a serving radio performs a block acknowledgement process with the client device 104a, such as by exchanging block acknowledge request (BAR) and block acknowledgement (BA) frames with client device 104a, radios in all of the AP devices 102 may hear the BA frame coming from the client device 104a and may use information in the BA frame as well as measurements of the BA frame for channel estimation. One or more AP devices (e.g., all the AP devices 102) with the current antenna configuration may calculate channel state information (CSI). The CSI may be computed for all of the subcarriers on the channel for the physical layer convergence protocol (PLCP) protocol data unit (PPDU) bandwidth.

Each of the AP devices 102 may have multiple antennas and/or multiple antenna paths. For example, if each of the AP devices 102 have sixteen antennas, multiple paths (e.g., four paths) may be sounded at a time. One antenna of overlap between soundings may be used for each client device 104. Under these circumstances, the BAR-BA frame exchange may be performed multiple times for implicit sounding of the channel, e.g., at least five times per client device. The number of times the BAR-BA frame exchange may be performed for a client device may be a quantity "antenna_config_changes". The procedure may be repeated for each of the client devices 104 in the system 100. If a quantity "num_clients" of client devices are present in the system 100, the total quantity "num_frame_exchanges" of BAR-BA frame exchanges that may be performed may be:

num_frame_exchanges=num_clients*antenna_config_changes

These BAR-BA frame exchanges may represent significant signal overhead. With these frame exchanges occurring at a rate of, for example, 6 Mbps, airtime usage may be high. Each frame exchange may involve a separate transmission opportunity (TxOP) that may take, for example, 156 µs, excluding carrier sense multiple access (CSMA) overhead. Sounding multiple client devices may contribute even further to the signal overhead and airtime usage. For example, sounding 37 client devices through 16 antennas with an arbitration inter-frame spacing (AIFS) of 2 and minimum contention window value (CWmin) of 15 may take, on average, approximately 44.7 ms.

Figure 2:
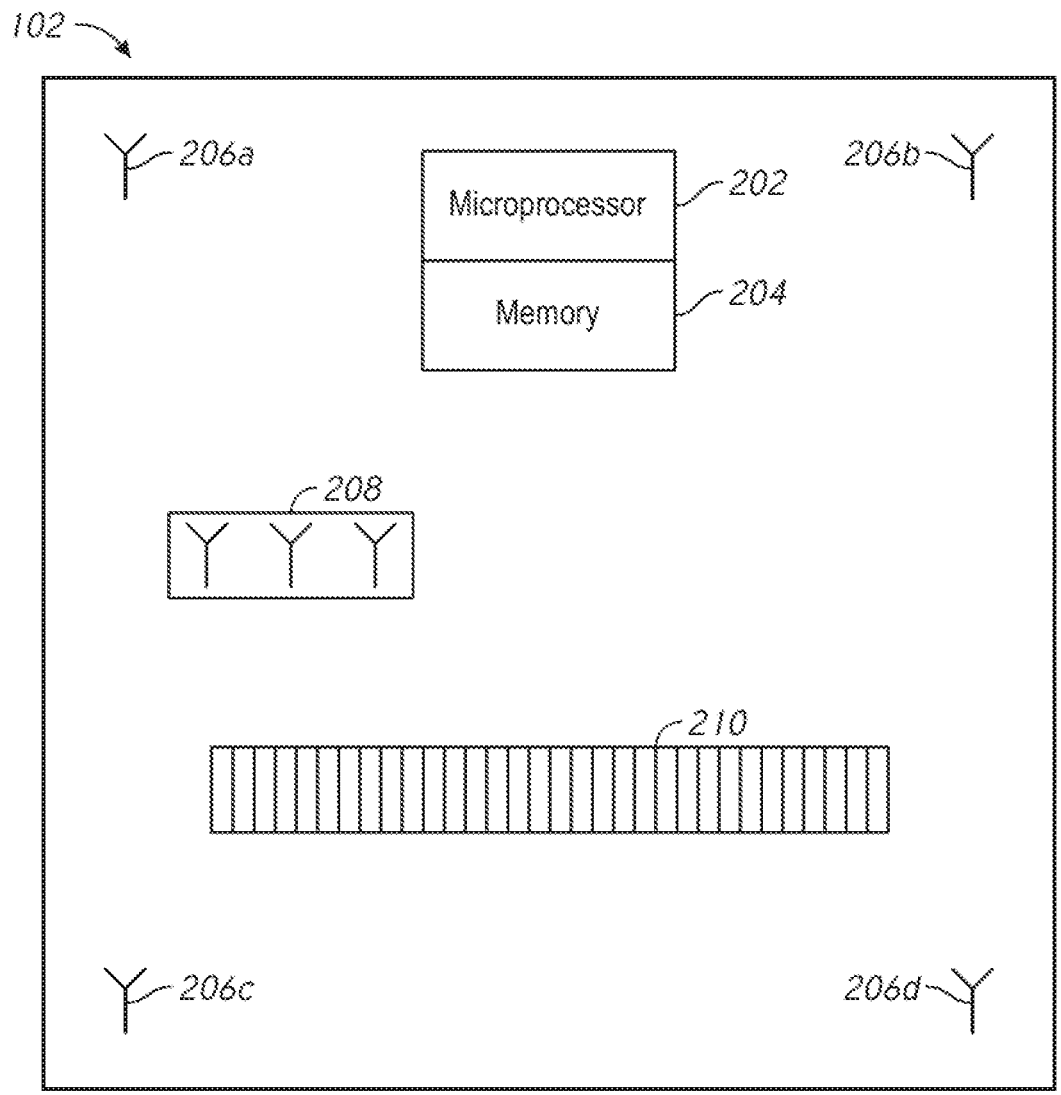
FIG. 2 is a diagram that illustrates an example wireless AP device that may form part of the system of FIG. 1.

FIG. 2 illustrates an example wireless AP device 102, such as one of the AP devices 102. The wireless AP device 102 may include a microprocessor 202 and a memory 204 in communication with the microprocessor 202. The wireless AP device 102 may include a number of antennas that may be controlled by the microprocessor 202. For example, antennas 206a, 206b, 206c, 206d (collectively referred to as antennas 206) may be implemented as dual-band (e.g., 2.4 GHz/5 GHz) antennas that may be used for sending and receiving signals to and from client devices, such as a client device 104. These signals may be used for configuring client devices or for receiving measurements or other data from client devices, for example. An antenna module 208 may include additional (e.g., dual-band) antennas that may also be used for sending and receiving signals to and from client devices. The antennas in the antenna module 208 may be implemented as, for example, Bluetooth low energy (BLE) antennas. An antenna array 210 may incorporate additional antennas that may be used for precise location of client devices. The wireless AP device 102 may incorporate more or fewer antennas and/or antenna types than are depicted in FIG. 2.

The antennas may be controlled by the microprocessor 202 in accordance with processor-executable instructions that may be stored in the memory 204. The microprocessor 202 may process signals received by one or more of the antennas 206, the antenna module 208, or the antenna array 210 from the client device 104 to determine the angle of arrival of the signals and the location-related measurement of the client device 104.

Figure 3:
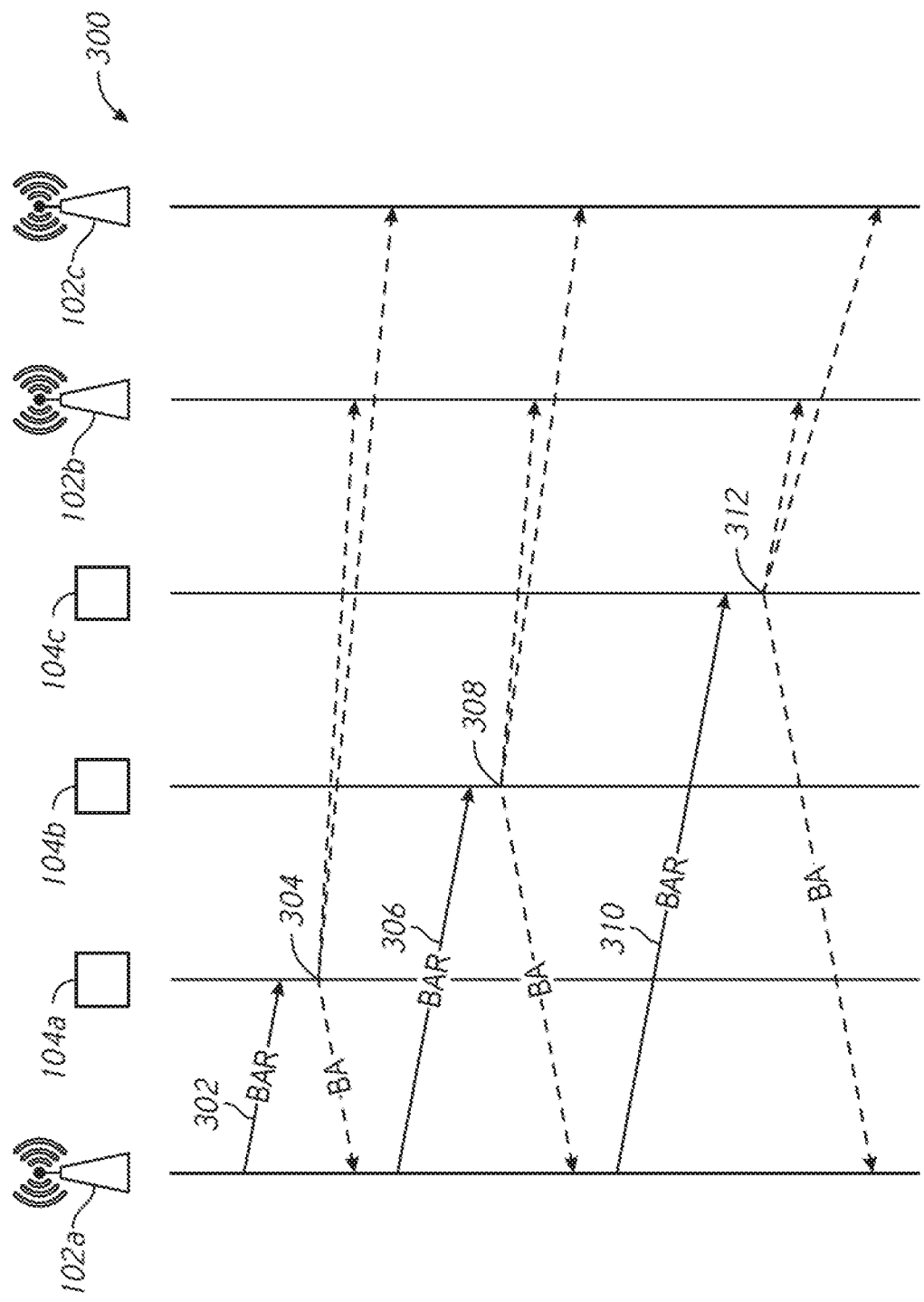
FIG. 3 is a flow diagram that illustrates an example BAR-BA exchange.

FIG. 3 is a flow diagram illustrating an example flow of an example BAR-BA exchange 300 among the AP device 102a and three client devices 104a, 104b, 104c of the system 100. At 302, the AP device 102a may send a BAR frame to the client device 104a. At 304, the AP device 102a may receive a BA frame from the client device 104a. As shown in FIG. 3, other AP devices in the system 100, such as AP devices 102b and/or 102c, may be able to receive or hear the BA frame from the client device 104a.

When the AP device 102a has sounded the channel for the client device 104a, it may sound the channel for the client device 104b. At 306, the AP device 102a may send a BAR frame to the client device 104b. At 308, the AP device 102a may receive a BA frame from the client device 104b. Other AP devices in the system 100, such as AP devices 102b and/or 102c, may be able to receive or hear the BA frame from the client device 104b.

When the AP device 102a has sounded the channel for the client device 104b, it may sound the channel for the client device 104c. At 310, the AP device 102a may send a BAR frame to the client device 104c. At 312, the AP device 102a may receive a BA frame from the client device 104c. Other AP devices in the system 100, such as AP devices 102b and/or 102c, may be able to receive or hear the BA frame from the client device 104c.

While FIG. 3 illustrates an example of a BAR-BA exchange for one AP device and three client devices, it will be appreciated that the system 100 may include more AP devices and/or client devices than shown in FIG. 3. In a system with many AP devices and/or client devices, a large number of BAR-BA frame exchanges may be involved in sounding the channel and determining locations of client devices. With frame exchanges occurring at a relatively low rate, e.g., a basic rate of approximately 6 Mbps, airtime usage may be significant.

Some applications, such as location determination using received signal strength indicator (RSSI) or angle of arrival (AoA) information from channel state information (CSI) may gain some resilience from a wider bandwidth. Some applications may not need or use a signal from a client device on all subcarriers. Such applications may have some tolerance for relatively minor reductions in accuracy, e.g., while getting a signal on fewer subcarriers.

Determining location using AoA information may benefit from a relatively strong line of sight (LOS) component and an environment with relatively low multipath interference. Determining location using RSSI information may be more tolerant of multipath interference. Determining location using RSSI information may be more accurate when multipath interference averages to the mean, for example, through the use of multiple receiving antennas and/or signals that may be wider than a coherence bandwidth.

In some embodiments, an AP device may implicitly sound a channel using orthogonal frequency division multiple access (OFDMA) signals transmitted by a client device. For example, the AP device may send the client device a trigger frame when the radios that may be interested in listening to the frame exchange may be on the channel. The client device may respond with an uplink OFMDA transmission, e.g., an uplink OFDMA PPDU.

Using OFDMA signals for implicit channel sounding may result in fewer frame exchanges relative to using BAR-BA frame exchanges. For example, for a single trigger frame transmission, there may be a single OFDMA response frame from several client devices, reducing the number of exchanges required to sound a large number of clients. This may vary based on the number of clients. For example, a single 80 MHz 802.11ax uplink PPDU may trigger up to 37 client devices. Up to nine client devices may be triggered for a 20 MHz channel.

Using OFDMA signals for implicit channel sounding may result in lower airtime usage relative to using BAR-BA frame exchanges. A trigger frame may be used to inform client devices which resource units (RUs) they may use for transmission. A trigger frame may be used to inform client devices what rate (e.g., potentially non-basic) they may use. A trigger frame may be used to inform client devices what transmit power they may use for the transmission. A buffer status report (BSR) trigger at 6 Mbps requesting M0 responses from 37 clients may use 792 μs. If repeated for five cases in a transmission opportunity, a BSR trigger may reduce the airtime used from 44.7 ms (e.g., in the case of using BAR-BA frame exchanges for sounding) to approximately 4.4 ms. Even if the process is repeated to achieve additional frequency diversity, it may still scale to approximately five times as many client devices.

Figure 4:
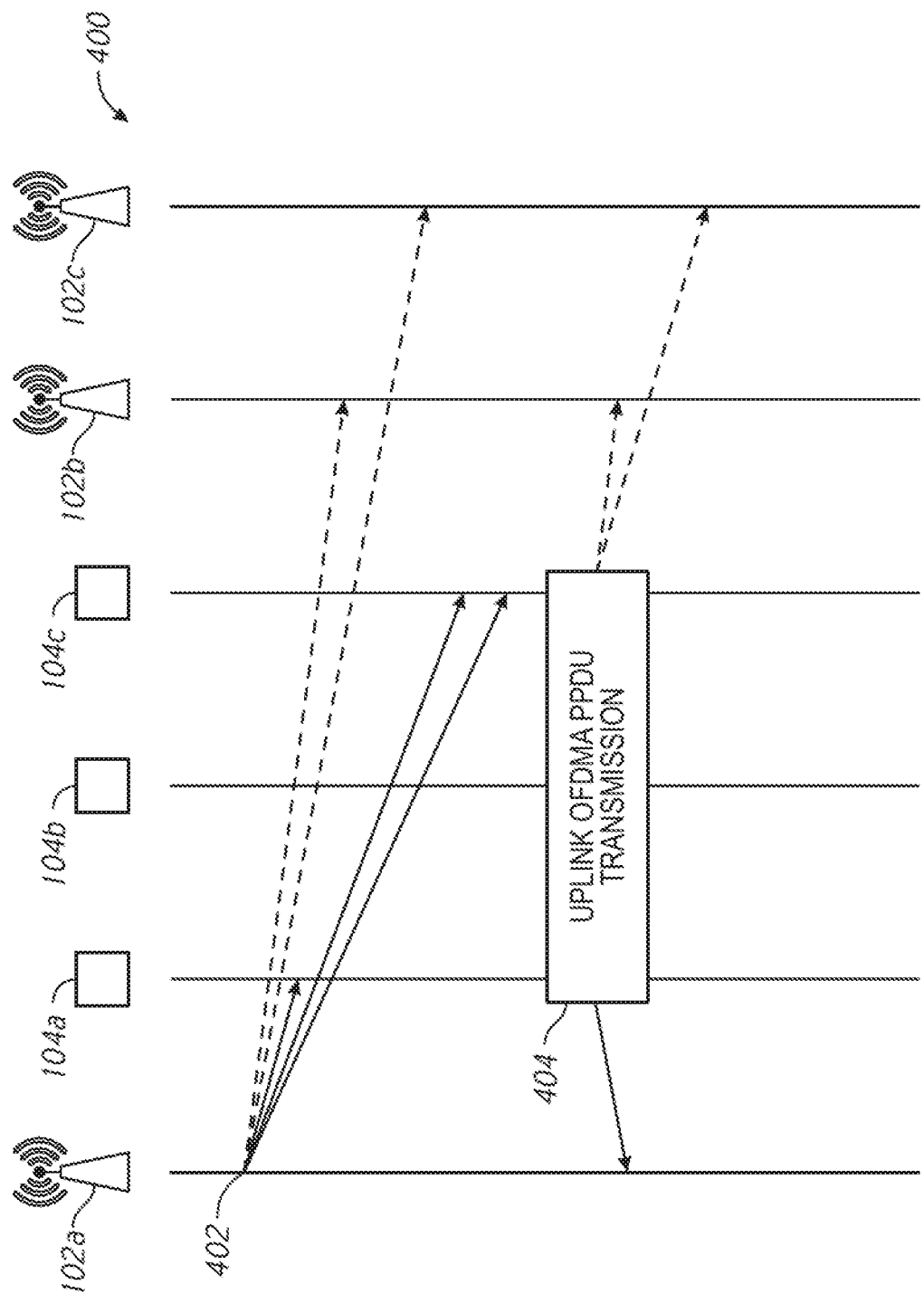
FIG. 4 is a flow diagram that illustrates an example process that may be performed by the system of FIG. 1.

FIG. 4 is a flow diagram illustrating an example sounding process 400 that may be carried out among the AP device 102a and three client devices 104a, 104b, 104c of the system 100. At 402, the AP device 102a may send a trigger frame to client devices 104a, 104b, 104c. This trigger frame may also be received by AP devices 102b, 102c. At 404, the client devices 104a, 104b, 104c may respond to the trigger frame by transmitting an uplink OFDMA PPDU. The response may be, for example, a high-efficiency trigger-based (HE TB) PPDU. The uplink OFDMA PPDU may be received by one or more of the AP devices 102b, 102c.

As shown in FIG. 4, in the example sounding process 400, a trigger frame is transmitted to multiple client devices 104. This may avoid the need to send separate transmissions, e.g., BAR frames, to the client devices 104 individually and may reduce airtime usage. Further, using a trigger frame may enable the AP device 102a to control certain characteristics of a response from a client device. For example, a trigger frame may include a parameter that specifies one or more characteristics of the response to the trigger frame. A trigger frame may specify a duration and/or a data rate of a response. The AP device 102a may use a trigger frame to specify the number of data symbols that should be included in a response from a client device. The AP device 102a may use a trigger frame to cause a client device to transmit multiple spatial streams if the client device has multiple transmitting antennas. The AP device 102a may specify these parameters such that other AP devices 102 may also get good quality measurements for each client device.

In some embodiments, an AP device may send a trigger frame, but a client device may not have data to send in response to the trigger frame. The AP device may send a trigger for buffer status report (BSR) or a multiple user BAR (MU-BAR). A trigger for BSR may result in a small PPDU. For legacy, non-compliant client devices that may not be compatible with OFDMA-based transmission or client devices that have signaled a temporary unwillingness to respond to trigger frames, the AP device may perform sounding using a BAR-BA frame exchange.

In some embodiments, detecting the location of a client device using RSSI may benefit from averaging over multipath interference, e.g., combining multiple measurements so that line of sight (LOS) components may be enhanced and non-LOS (e.g., multipath) components may be attenuated. Detecting the location of a client device using angles of arrival (AoAs) may also benefit from averaging over multipath interference. A client device may be triggered in multiple uplink (UL) OFDMA PPDUs. For example, 37 client devices may be triggered at one mapping. The client devices may be triggered again with a circular rotation of, for example, half of the channel bandwidth so that each client device may transmit over a different frequency (e.g., different by half of the channel bandwidth).

Channel information may be obtained for two widely spaced frequency allocations or resource units that may be relatively independent of one another. The AP device or mobility services engine (MSE) may combine the channel information for each client device to extract a single, more accurate, RSSI or phase difference or AoA measurement.

Client devices may be triggered more than two times with an appropriate amount of circular rotation relative to the channel bandwidth. Triggering of client devices may involve mixing the client devices dynamically according to other recent transmissions. Client devices may be grouped for triggering together. A client device that is characterized by a high error (e.g., root mean square (RMS) error) may be sounded using coarse OFDMA, e.g., using 20 MHz or 40 MHz subchannels or an entire channel.

These techniques may produce relatively independent channel information that may be combined to improve the accuracy of RSSI or phase difference or AoA measurement.

Figure 5:
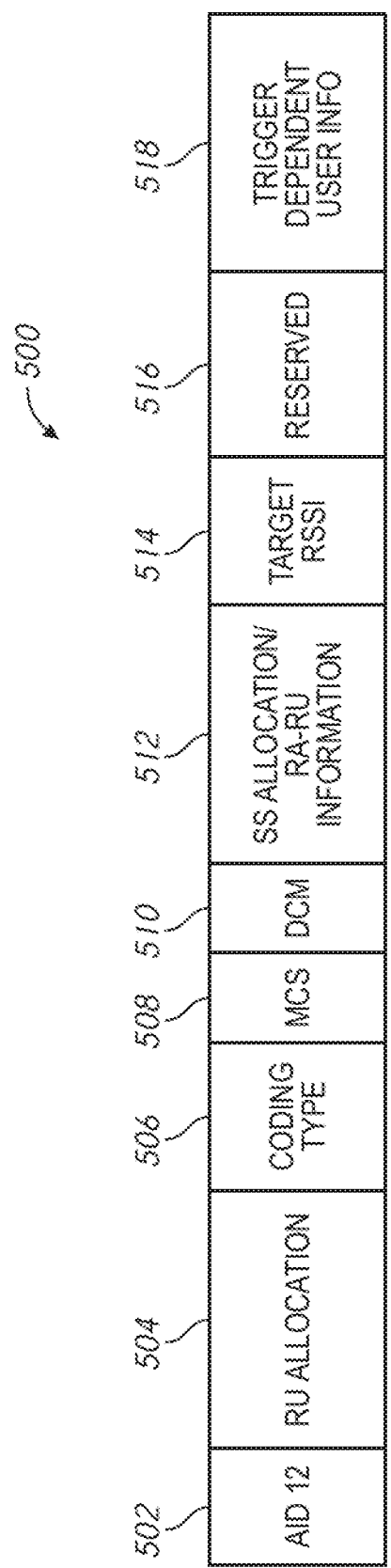
FIG. 5 is a diagram that illustrates an example data structure.

FIG. 5 is a diagram illustrating an example data structure 500 that may form part of a trigger frame in some embodiments. The data structure 500 may be implemented as a user information field having a plurality of subfields.

An AID12 subfield 502 may carry information that identifies the device for which the user information field is intended. The AID12 subfield 502 may carry the 12 least significant bits (LSBs) of an association identifier (AID) that identifies the intended device. Certain values in the AID12 subfield 502 may be reserved. For example, an AID12 subfield having the value 0 or 2045 may indicate that the user information field allocates one or more contiguous resource units (RUs) for random access. An AID12 subfield having the value 2046 may indicate an unassigned RU. An AID12 subfield having the value 4095 may indicate the start of a padding field for the trigger frame.

A resource unit (RU) allocation subfield 504 may indicate the RU used by a high-efficiency trigger-based (HE TB) PPDU of the device identified by the AID12 subfield 502. For example, a first bit may be set to 0 to indicate that the allocated RU is located within the primary 80 MHz. The first bit may be set to 1 to indicate that the allocated RU is located within the secondary 80 MHz. Subsequent bits in the RU allocation subfield 504 may indicate further details of the RU allocation, as disclosed, for example, in the IEEE 802.11ax standard.

A coding type subfield 506 may indicate a code type of a HE TB PPDU that may be sent by the client device in response to the trigger frame. The coding type subfield 506 may have a value of 0 to indicate braided convolutional coding (BCC). The coding type subfield 506 may have a value of 1 to indicate low density parity check (LDPC) coding.

A modulation and coding set (MCS) subfield 508 may indicate the MCS of the HE TB PPDU. Encoding of the MCS subfield 508 may be disclosed, for example, in the IEEE 802.11ax standard.

A dual carrier modulation (DCM) subfield 510 may indicate dual carrier modulation of the HE TB PPDU. The DCM subfield 510 may have a value of 1 to indicate that DCM may be used in the HE TB PPDU. The DCM subfield 510 may have a value of 0 to indicate that DCM is not used.

A spatial stream (SS) allocation/random access resource unit (RA-RU) information subfield 512 may indicate the spatial streams of the HE TB PPDU if the AID12 subfield 502 has a value that is neither 0 nor 2045. The AP device may use this subfield may be used to specify how many spatial streams the client device should transmit, e.g., how many antennas the client device should transmit from if the client device has multiple transmitting antennas. The SS allocation/RA-RU information subfield 512 may include subfields that indicate the starting spatial stream and/or the number of spatial streams.

If the AID12 subfield 502 has a value of either 0 or 2045, the SS allocation/RA-RU information subfield 512 may indicate RA-RU allocation. The SS allocation/RA-RU information subfield 512 may include a subfield that indicates the number of contiguous RUs that may be allocated for uplink (UL) OFDMA-based random access (UORA). The starting spatial stream and the number of spatial streams of the HE TB PPDU transmitted on each RA-RU may be 1. The SS allocation/RA-RU information subfield 512 may include a subfield that may indicate that RA-RUs may not be allocated in subsequent trigger frames that may be sent before the end of a current target wait time (TWT) service period (SP) or the end of the current transmission opportunity, if there is no TWT SP.

A target RSSI subfield 514 may represent the strength of the received signal. The target RSSI subfield 514 may indicate the target receive signal power averaged over the AP device antenna connectors for the HE TB PPDU.

The user information field may include a reserved field 516. The user information field may include a trigger-dependent user information subfield 518.

Figure 6:
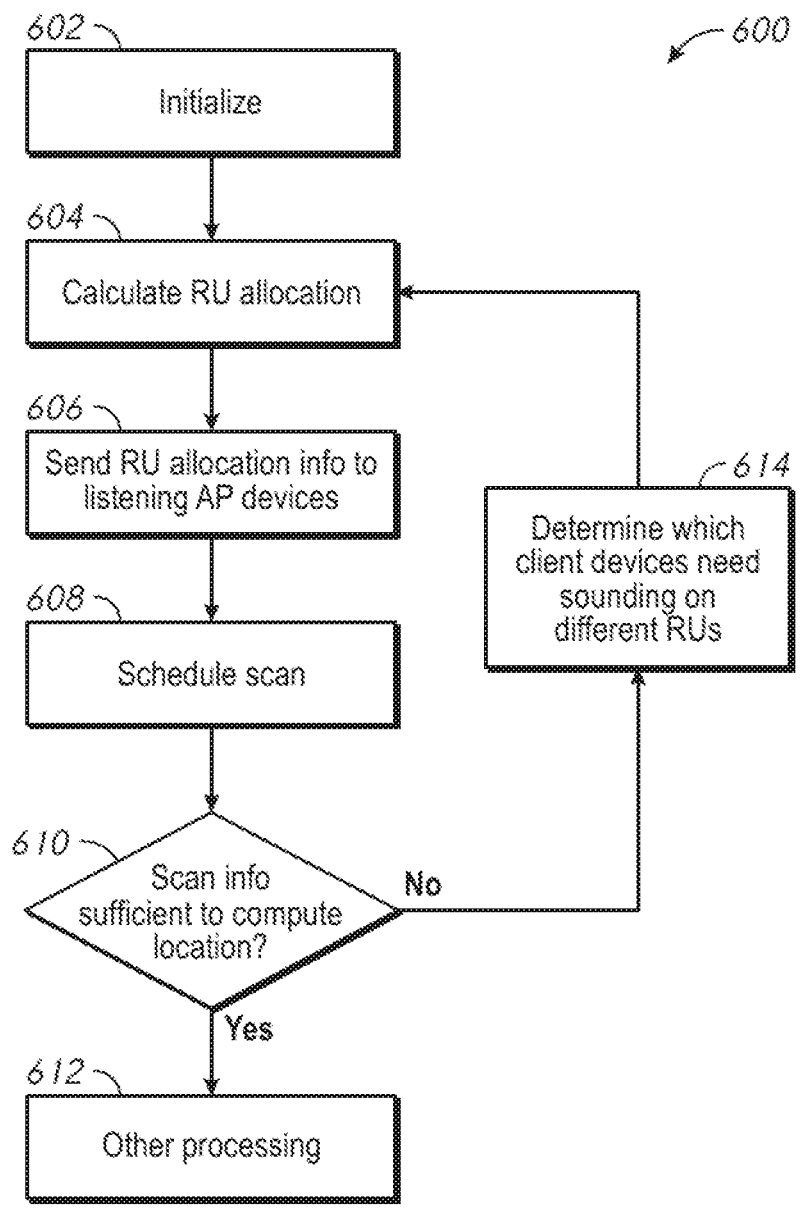
FIG. 6 is a block diagram that illustrates an example sounding process.

FIG. 6 is a flow diagram illustrating an example sounding process 600 that may be performed by a serving AP device, such as AP device 102a. At 602, the AP device 102a may initialize the sounding process. At 604, the AP device 102a may calculate a resource unit (RU) allocation to be sent in a trigger frame. The RU allocation may be calculated based at least in part on a determination of which RUs to search for a client in the OFDMA PPDU. This information may be calculated centrally and may be propagated offline, e.g., before the trigger frame is sent by the serving AP device.

A radio, e.g., an AP device 102, that is performing scanning may decode the trigger frame and use information derived from decoding the trigger frame. A scanning radio may not support demodulating of uplink trigger-based (UL-TB) PPDUs that it did not trigger. It may be difficult to decode the trigger in time to inform the baseband so that the baseband can demodulate the PPDU. Even if the baseband may not be able to demodulate each RU, the baseband may generate channel state information (CSI) and may depend on the serving radio to decode the data, e.g., to know that the client device responded. The CSI may verify that the RSSI is consistent, e.g., as opposed to biased from a collision further from the serving radio. A scanning radio may generate angles of arrival (AoAs) and/or RSSI for each RU on each antenna for all UL-TB PPDUs, assuming that they may be triggered similarly.

The AP device 102a may calculate the RU allocation based at least in part on the quantity of client devices 104 that can be sounded during a single trigger frame exchange, e.g., for applications the determine the location of a client device using an angle of arrival. This quantity may be affected by the hardware capabilities of the receiver, e.g., the receiver may be capable of sounding sixteen client devices. The quantity may be affected by a constraint associated with a standard. For example, for communications compliant with the Institute of Electrical and Electronics Engineers (IEEE) 802.11ax standard, a trigger frame in the 80 MHz band may be able to sound 37 client devices. A trigger frame in the 160 MHz band may be able to sound 74 client devices.

The AP device 102a may calculate the RU allocation based at least in part on considerations associated with the application. For example, some applications, such as location detection based on time difference of arrival (TDOA) may use significant computational resources to work with narrowband sounding.

The AP device 102a may communicate (e.g., send or receive using a wireless or other interface) signaling relating to a client device allocation for a location-related measurement. This signaling may include a trigger frame. The signaling may include a frame describing the client device allocation. The signaling may include a frame that may be received over an interface other than a wireless medium.

For example, at 606, the AP device 102a may send RU allocation information to listening AP devices, e.g., AP devices 102b, 102c. The AP device 102a may transmit a trigger frame, and AP devices 102b, 102c may receive and interpret the trigger frame.

At 608, the AP device 102a may schedule a location detection scan. For example, the AP device 102a may send triggers and listen for a response, e.g., an uplink OFDMA PPDU, from a client device 104. At 610, the AP device 102a may determine whether the location detection scan is sufficient to determine the location-related measurement of the client device 104. For example, if the AP device 102a receives a signal, the AP device 102a may attempt to determine a received signal strength indicator (RSSI) and/or an angle of arrival (AoA) associated with the signal. The AP device 102a may attempt to determine the location-related measurement of the client device 104 or may attempt to create a probability map describing a probable location-related measurement of the client device 104. The AP device 102a may attempt to determine a location-related measurement of the client device 104, for example, based on the RSSI and/or AoA and may use information from other AP devices 102 in the system 100.

If the location detection scan is sufficient to determine the location-related measurement of the client device 104, the AP device 102a may perform additional processing at 612. On the other hand, if the location detection scan is not sufficient to determine the location-related measurement of the client device 104 or if the location-related measurement of the client device 104 cannot be determined with at least a threshold level of precision, the AP device 102a may determine which client device or devices may be sounded again at 614. This sounding may be performed with different resource units. At 604, the AP device 102a may again calculate a resource unit allocation, with different resource units, to be sent in a new trigger frame.

In some embodiments, an adaptive sounding technique may involve performing sounding across the subcarriers (e.g., all subcarriers) that may be used by a certain application or by a particular client device 104. Sounding may be performed using OFDMA transmissions for client devices that support and currently allow OFDMA-based transmission. Sounding may be performed using BAR-BA frame exchanges for client devices that do not support or currently allow OFDMA-based transmission.

The AP device 102a may determine to (e.g., always) sound a client device multiple times, e.g., twice. The AP device 102a may rotate the subcarriers that are sounded in the first iteration of the sounding process. For example, a circular rotation of half of the channel bandwidth may be used. The client devices may transmit using a frequency that may differ (e.g., by half of the channel bandwidth) from the frequency used in the first iteration of the sounding process. Client devices may be triggered more than two times with an appropriate amount of circular rotation relative to the channel bandwidth.

Even if the AP device 102a sounds client devices multiple times, significant savings in the amount of airtime involved in sounding may be realized. For example, if the AP device 102a sounds client devices twice, the airtime involved may be reduced by a factor of five.

Figure 7:
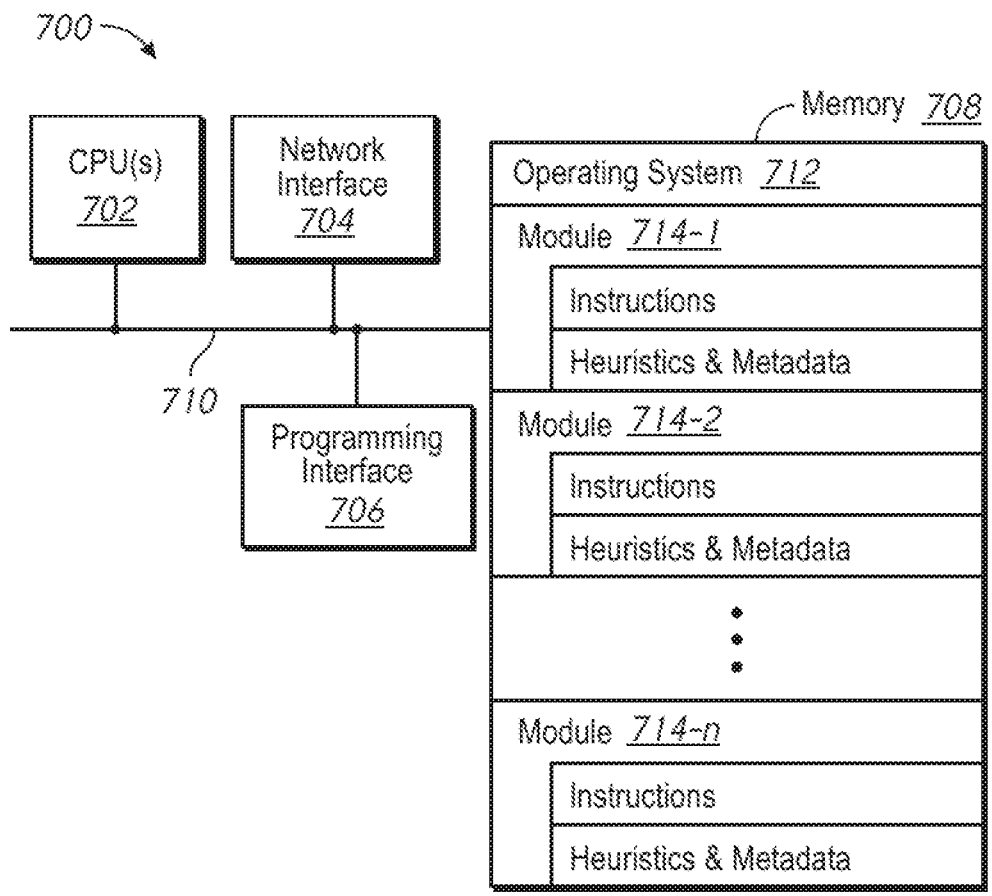
FIG. 7 is a block diagram that illustrates an example server system.

FIG. 7 is a block diagram of an example server system 700 enabled with one or more components of a device, server, or system in accordance with some embodiments. While certain specific features are illustrated, those of ordinary skill in the art will appreciate from the present disclosure that various other features have not been illustrated for the sake of brevity, and so as not to obscure more pertinent aspects of the embodiments disclosed herein. To that end, as a non-limiting example, in some embodiments the server system 700 may include one or more processing units (CPUs) 702, a network interface 704, a programming interface 706, a memory 708, and one or more communication buses 710 for interconnecting these and various other components.

The network interface 704 may be provided to, among other uses, establish and/or maintain a metadata tunnel between a cloud-hosted network management system and at least one private network including one or more compliant devices. In some embodiments, the one or more communication buses 710 may include circuitry that interconnects and controls communications between system components. The memory 708 may include one or more of high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. The memory 708 may include one or more storage devices remotely located from the one or more CPUs 702. The memory 708 may comprise a non-transitory computer readable storage medium.

In some embodiments, the memory 708 or the non-transitory computer readable storage medium of the memory 708 may include (e.g., store) the following programs, modules, and data structures, or a subset thereof including one or more of an operating system 712 or various modules 714-1, 714-2, . . . , 714-n. The modules 714-1, 714-2, . . . , 714-n, individually and/or collectively, perform one or more of the operations described herein. To that end, in various embodiments, the modules 714-1, 714-2, . . . , 714-n may include respective instructions and/or logic, and heuristics and metadata.

Various aspects of embodiments within the scope of the appended claims are described above. It should be apparent that the various features of embodiments described above may be embodied in a wide variety of forms and that any specific structure and/or function described above is merely illustrative. Based on the present disclosure, one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    communicating, at an access point (AP) device, signaling relating to a client device allocation for a location-related measurement;
    transmitting a first trigger frame;
    receiving a response to the first trigger frame from a client device, the response comprising an uplink orthogonal frequency division multiple access (OFDMA) transmission;
    determining a location-related measurement of the client device based on the response to the first trigger frame;
    identifying that the location-related measurement of the client device is not determined with at least a threshold level of precision based on the response to the first trigger frame, and in response:
        sending a second trigger frame to the client device, the second trigger frame having a different subcarrier allocation in a frequency channel than the first trigger frame;
        receiving a response to the second trigger frame from the client device; and
        determining the location-related measurement of the client device based on the response to the second trigger frame.

2. The method of claim 1, wherein the signaling relating to the client device allocation comprises at least one of the first trigger frame, a frame describing the client device allocation, or a frame received over an interface other than a wireless medium.

3. The method of claim 1, further comprising determining the location-related measurement of the client device based on at least one of a received signal strength indicator (RSSI) or an angle of arrival (AoA) associated with the response to at least one of the first or second trigger frames.

4. The method of claim 1, wherein the response to at least one of the first or second trigger frames comprises an 802.11 high-efficiency trigger-based (HE TB) physical layer convergence protocol (PLCP) protocol data unit (PPDU).

5. The method of claim 1, further comprising:
transmitting a third trigger frame for a second client device;
identifying that the second client device does not respond to the third trigger frame, and in response:
sending a single user (SU) transmission to the second client device;
receiving a response to the SU transmission from the second client device; and
determining the location-related measurement of the second client device based on the response to the SU transmission.

6. The method of claim 5, wherein the SU transmission comprises at least one of a block acknowledge request (BAR) or a quality of service (QoS) null transmission.

7. The method of claim 1, wherein at least one of the first or second trigger frames comprises a parameter specifying a characteristic of the response to the respective trigger frame.

8. The method of claim 7, wherein the characteristic of the response to the respective trigger frame comprises at least one of a resource unit (RU) allocation, a duration, a data rate, or a spatial stream allocation.

9. An access point (AP) device comprising:
a network interface in communication with a network;
a processor configured to execute computer readable instructions included on a non transitory memory; and
a non-transitory memory including processor-readable instructions, that when executed by the processor, cause the AP device to:
communicate signaling relating to a first client device allocation for a location-related measurement;
transmit a first trigger frame;
receive a response to first the trigger frame from a first client device, the response comprising an uplink orthogonal frequency division multiple access (OFDMA) transmission;
determine a location-related measurement of the first client device based on the response to the first trigger frame;
transmit a second trigger frame for a second client device;
identify that the second client device does not respond to the second trigger frame, and in response:
send a single user (SU) transmission to the second client device;
receive a response to the SU transmission from the second client device; and
determine the location-related measurement of the second client device based on the response to the SU transmission.

10. The AP device of claim 9, wherein the signaling relating to the first client device allocation comprises at least one of the first trigger frame, a frame describing the first client device allocation, or a frame received over an interface other than a wireless medium.

11. The AP device of claim 9, wherein the processor-readable instructions cause the AP device to determine the location-related measurement of the first client device based on at least one of a received signal strength indicator (RSSI) or an angle of arrival (AoA) associated with the response to the first trigger frame.

12. The AP device of claim 9, wherein the response to the first trigger frame comprises an 802.11 high-efficiency trigger-based (HE TB) physical layer convergence protocol (PLCP) protocol data unit (PPDU).

13. The AP device of claim 9, wherein the processor-readable instructions cause the AP device to:
identify that the location-related measurement of the first client device is not determined with at least a threshold level of precision based on the response to the first trigger frame:
send a third trigger frame to the first client device, the third trigger frame having a different subcarrier allocation in a frequency channel than the first trigger frame;
receive a response to the third trigger frame from the first client device; and
determine the location-related measurement of the first client device based on the response to the third trigger frame.

14. The AP device of claim 9, wherein the SU transmission comprises at least one of a block acknowledge request (BAR) or a quality of service (QoS) null transmission.

15. The AP device of claim 9, wherein the first trigger frame comprises a parameter specifying a characteristic of the response to the first trigger frame, the characteristic of the response to the first trigger frame comprising at least one of a resource unit (RU) allocation, a duration, a data rate, or a spatial stream allocation.

16. A method comprising:
receiving, at a first access point (AP) device, a signal from a second AP device, the signal relating to a client device allocation for a location-related measurement;
receiving from a client device a response to a first trigger frame, the response comprising an uplink orthogonal frequency division multiple access (OFDMA) transmission;
determining a location-related measurement of the client device based on the response to the first trigger frame;
identifying that the location-related measurement of the client device is not determined with at least a threshold level of precision based on the response to the first trigger frame, and in response:
sending a second trigger frame to the client device, the second trigger frame having a different subcarrier allocation in a frequency channel than the first trigger frame;
receiving a response to the second trigger frame from the client device; and
determining the location-related measurement of the client device based on the response to the second trigger frame.

17. The method of claim 16, wherein the signal relating to the client device allocation comprises at least one of the first trigger frame, a frame describing the client device allocation, or a frame received over an interface other than a wireless medium.

18. The method of claim 16, further comprising:
receiving the first trigger frame from the second AP device; and receiving the response to the first trigger frame from the client device.

* * * * *